United States Patent
Ben Arzi et al.

(10) Patent No.: US 10,715,971 B2
(45) Date of Patent: *Jul. 14, 2020

(54) METHOD AND SYSTEM FOR CONFIGURING CALLER LINE IDENTIFICATION FOR SHORT MESSAGE SERVICE

(71) Applicant: SPIKKO TELECOM LTD., Tel-Aviv (IL)

(72) Inventors: Shai Ben Arzi, Ramat Gan (IL); Nimrod Sandlerman, Ramat Gan (IL)

(73) Assignee: SPIKKO TELECOM LTD., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,697

(22) Filed: Apr. 28, 2019

(65) Prior Publication Data

US 2019/0268734 A1    Aug. 29, 2019

Related U.S. Application Data

(63) Continuation of application No. 15/307,824, filed as application No. PCT/IB2015/053048 on Apr. 27, 2015, now Pat. No. 10,299,087.

(Continued)

(51) Int. Cl.
*H04M 3/42* (2006.01)
*H04W 4/16* (2009.01)
*H04W 8/18* (2009.01)

(52) U.S. Cl.
CPC ........ *H04W 4/16* (2013.01); *H04M 3/42059* (2013.01); *H04M 3/42195* (2013.01); *H04M 3/42289* (2013.01); *H04M 3/42382* (2013.01); *H04W 8/183* (2013.01); *H04M 2203/1008* (2013.01)

(58) Field of Classification Search
None
See application file for complete search history.

(56) References Cited

U.S. PATENT DOCUMENTS

| 7,929,955 B1 * | 4/2011 | Bonner | H04M 3/42068 |
| | | | 455/414.1 |
| 10,299,087 B2 * | 5/2019 | Ben Arzi | H04M 3/42059 |

(Continued)

*Primary Examiner* — Erika A Washington
(74) *Attorney, Agent, or Firm* — AlphaPatent Associates, Ltd; Daniel J. Swirsky

(57) ABSTRACT

A method performed by, and a system embedded within, a communication device operating in a communication network, performing the steps of: obtaining a plurality of caller identification codes for the caller device, where each of the caller identification codes identifies the caller device in a network; obtaining at least one rule for selecting a caller identification code from the plurality of caller identification codes according to a characteristic of the called device; obtaining a characteristic of the called device; selecting a caller identification code from the plurality of caller identification codes according to the characteristic of the destination telephone identification, or caller environment or destination environment parameters, or caller decision on the time of making the call; and forwarding the selected caller identification code to any of another communication network and a terminal device of a communication network.

21 Claims, 8 Drawing Sheets

Related U.S. Application Data

(60) Provisional application No. 61/986,357, filed on Apr. 30, 2014, provisional application No. 62/077,577, filed on Nov. 10, 2014.

(56) References Cited

U.S. PATENT DOCUMENTS

| | | | | |
|---|---|---|---|---|
| 2004/0266415 | A1* | 12/2004 | Belkin | H04M 3/42042 455/415 |
| 2007/0121863 | A1* | 5/2007 | Nagel | H04M 3/42008 379/161 |
| 2012/0282924 | A1* | 11/2012 | Tagg | H04W 48/18 455/432.1 |
| 2018/0234541 | A1* | 8/2018 | Rensburg | H04M 3/42042 |

* cited by examiner

| NAME | TELEPHONE | NETWORK | CLI |
|---|---|---|---|
| JOHN | +1-202-626-3757 | AT&T | 941-487-0843 |
| SARAH | +44-131-243-0661 | BT | 7-014-223-846 |
| MICHAEL | +49-89-3177-0853 | T-MOBILE | 151-588-2529 |
| MARCEL | +33-9-50.92,23,73 | FT | 6-23.78.43.76 |

Fig. 4

METHOD AND SYSTEM FOR CONFIGURING CALLER LINE IDENTIFICATION FOR SHORT MESSAGE SERVICE

CROSS-REFERENCE TO RELATED APPLICATIONS

The present application is a continuation of U.S. patent application Ser. No. 15/307,824, filed Oct. 30, 2016, now U.S. Pat. No. 10,299,087, which is a U.S. National Phase Application under 35 U.S.C. 371 of International Application No. PCT/IB2015/053048, which has an international filing date of Apr. 27, 2015, and which claims the benefit of priority from U.S. Provisional Patent Application No. 61/986,357, filed Apr. 30, 2014, and from U.S. Provisional Patent Application No. 62/077,577 filed Nov. 10, 2014, the contents of which applications are incorporated herein by reference.

FIELD

The present embodiments relate to telecommunications (telecom) and/or data communications and, more particularly, but not exclusively to a protocol by which a calling device identifies to a called device.

BACKGROUND

Caller identification, also known as Caller ID (CID), calling line identification (CLI or CLID), calling number delivery (CND), calling number identification (CNID) or calling line identification presentation (CLIP), is a telephone service by which a calling device identifies itself to the called device. The service is available in analog and digital telephone systems and in networks using the Internet Protocol (IP) including voice over Internet Protocol (VoIP). Typically, the called device, or the network's switch, or a similar device, transmits the CLI to the called party's telephone equipment during the call setup stage, such as during the ringing signal or period. The CLI can also provide a string of alphanumeric characters such as a name associated with the calling telephone number. The CLI enables the caller to identify itself to the called party in various ways before the called party answers the call. For example, when calling a call center the caller can send an identification code associated with the called party, such as an account number. A network service as disclosed in US patent application 20130003947 enables the caller to adapt the CLI to the called party. However, the service is limited to a caller subscribing to the network providing the service. There is thus a need for addressing these and/or other issues associated with the prior art.

SUMMARY

According to one aspect of the present invention there is provided a system, method, and computer program product for configuring a calling line identification (CLI), performed by a communication device operating in a communication network, the method including: obtaining a plurality of caller identification codes for the caller device, where each of the caller identification codes identifies the caller device in a network, obtaining at least one rule for selecting a caller identification code from the plurality of caller identification codes according to a characteristic of any of the caller device, a called device, and a parameter obtained from an external source, obtaining the characteristic, selecting a caller identification code from the plurality of caller identification codes according to the characteristic; and forwarding the selected caller identification code to any of: another communication network, and the called device.

According to another aspect of the present invention there is provided a system, method, and computer program product for configuring CLI where the characteristic includes any of: a user selection of a default identification code irrespective of the current identification code of the caller device, current geographical location of any of the caller device and called device, a communication network associated with the called device, an identification code associated with the called device, an identification code previously sent to the called device, an identification code associated with a telephone number previously used by the called device, a characteristic of a number dialed for the called party, a user selection of any of the above.

According to yet another aspect of the present invention there is provided a system, method, and computer program product for configuring CLI where the characteristic of a number dialed includes a prefix of the number dialed.

According to still another aspect of the present invention there is provided a system, method, and computer program product for configuring CLI where the prefix is associated with any of a communication network, a geographical location, a network functional range, and an organization.

Further according to another aspect of the present invention there is provided a system, method, and computer program product for configuring CLI where the identification code includes a network access number and a private telephone number.

Still further according to still another aspect of the present invention there is provided a system, method, and computer program product for configuring CLI where the device is a part of a the communication network.

Yet further according to still another aspect of the present invention there is provided a system, method, and computer program product for configuring CLI where the device is a part of a caller device in a communication network.

Even further according to still another aspect of the present invention there is provided a system, method, and computer program product for identifying a calling party to a called party in an integrated communication network, where the integrated communication network includes a plurality of native communication networks, where the calling party subscribes to at least two native communication networks, the method including: obtaining a plurality of caller identification codes for the calling party, where each of the caller identification codes identifies the calling party in one of the native communication network, obtaining at least one rule for selecting a caller identification code from the plurality of caller identification codes according to a characteristic of any of the calling party, a called party, and a parameter obtained from an external source, obtaining the characteristic, selecting a caller identification code from the plurality of caller identification codes according to the characteristic, and forwarding the selected caller identification code to any of: a native communication network; and the called party.

Additionally according to still another aspect of the present invention there is provided a system, method, and computer program product for identifying a calling party to a called party while sending content to the called party, where the step of forwarding the selection from the caller device to the communication device connecting the caller device with the called device is performed in a communication channel that is different from the communication channel used to send the content from the caller device to the called device.

Additionally according to still another aspect of the present invention there is provided a system, method, and computer program product for identifying a calling party to a called party while sending content to the called party where the content is at least one of a text message, an SMS message, a multimedia message, an image message, and a video message.

Further according to still another aspect of the present invention there is provided a system, method, and computer program product for identifying a calling party to a called party where a caller identification code of the plurality of caller identification codes of the caller device identifies the caller device in a second communication network, the second communication network being a different communication network than the communication network currently serving the caller device.

Yet further according to still another aspect of the present invention there is provided a system, method, and computer program product for identifying a calling party to a called party where a caller identification code of the plurality of caller identification codes of the caller device is associated with a SIM card provided by a second communication network.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Embodiments of the invention are herein described, by way of example only, with reference to the accompanying drawings. With specific reference now to the drawings in detail, it is stressed that the particulars shown are by way of example and for purposes of illustrative discussion of several embodiments of the present invention only, and are presented in order to provide what is believed to be a useful and readily understood description of the principles and conceptual aspects of the invention. In this regard, no attempt is made to show structural details of the invention in more detail than is necessary for an understanding of the invention, the description taken with the drawings making apparent to those skilled in the art how the several forms of the invention may be embodied in practice.

In the drawings:

FIG. 4 is a simplified illustration of a CLI allocation table;

DETAILED DESCRIPTION

Figure 1:
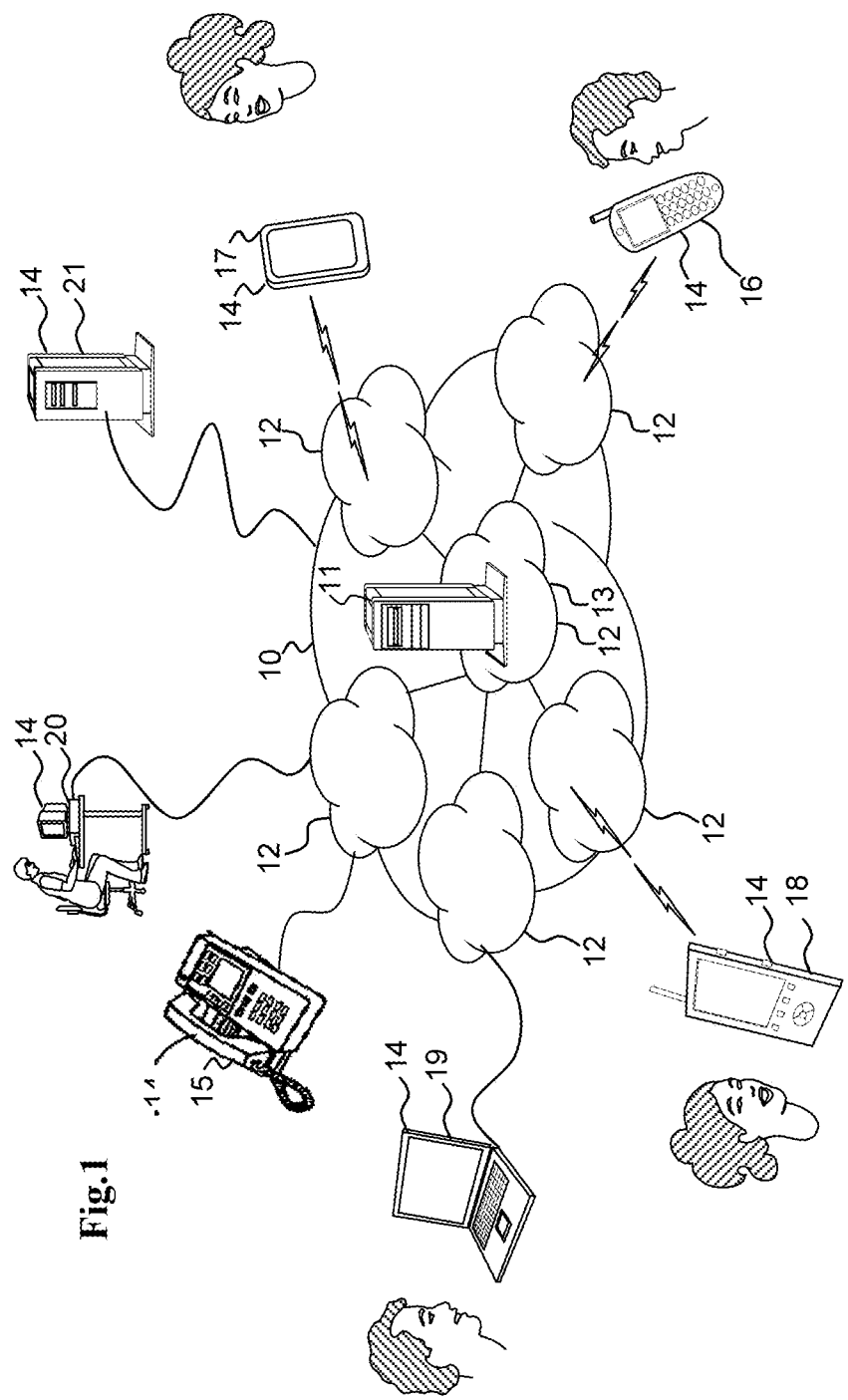
FIG. 1 is a simplified block diagram of a communication network including a CLI configuring device.

The present embodiments comprise a system, method, and computer program product for configuring caller line identification (CLI) according to rules. The principles and operation of a system, method, and computer program product for CLI configuration according to the various embodiments presented herein may be better understood with reference to the following drawings and accompanying description.

Before explaining at least one embodiment in detail, it is to be understood that the embodiments is not limited in its application to the details of construction and the arrangement of the components set forth in the following description or illustrated in the drawings, and the embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different Figs. may use different scales and different scales can be used even within the same drawing, for example different scales for different views of the same object or different scales for the two adjacent objects.

The CLI enables the caller to identify itself to the called party before the called party answers the call. The term CLI herein refers to caller line identification, or calling line identification, also known as Caller ID (CID or CLID), calling number delivery (CND), calling number identification (CNID) or calling line identification presentation (CLIP). Typically, CLI is a service provided by the network to the device receiving the call. However, the CLI data can be originated by the calling device.

The CLI service is available in analog and digital telephone systems and in networks using the Internet Protocol (IP) including voice over Internet Protocol (VoIP). Typically, the called device receives the CLI data during the call setup stage, such as during the ringing signal or period. The CLI data may include a string of alphanumeric characters, typically including the telephone number of the calling party, and optionally other data, such as a name associated with the calling telephone number.

In other applications, the term CLI may refer to any similar mechanism and/or method used for identifying the caller, a calling device, a telephone number associated with the calling device, or any other type of identification, etc. The caller, the calling device, and their identifying code such as the CLI may be associated with a regular call or session, such as a voice (telephone) call, a multimedia call, a video call, etc., and/or a message (including but not limited to short message service), a store & forwards service, a content or data delivery service, etc. The caller is typically a user placing the call, and/or a user initiating the communication session, and/or a user sending a message, etc.

A CLI receiving device may be integrated in the telephone set or separated from the telephone set. The CLI receiving device typically includes a phone book, which is a database or a list of telephone numbers associated with names. Alternatively, the CLI receiving device (or software program) has access to the phone book of the telephone in which the CLI receiving device is integrated. Thus, when the CLI is received the CLI receiving device (or the telephone set) searches the phone book for the telephone number received in the CLI data. If the telephone number is found in the phone book, the CLI receiving device (or the telephone set) displays the name associated with the telephone number. If the telephone number is not found in the phone book the CLI receiving device (or the telephone set) displays the received telephone number.

The present invention comprises a system, method, and computer program product for configuring caller line identification (CLI) according to rules, such as:

According to characteristics associated with the particular called party.

According to characteristics associated with the calling party.

According to characteristics associated with a communication network providing a telephone service to any of the parties to the call.

According to characteristics associated with the particular call.

Any combination thereof.

Characteristics used by rules for configuring CLI to be sent, and for interpreting CLI received, include, but are not limited to, geographic location of the called party, geographic location of the calling party, call history between the particular parties, etc. According to one embodiment of the present invention the CLI may additionally carry call information indicating priority, urgency, subject of the call, etc.

It is appreciated that call history may include various types of call, or sessions, such as voice, multimedia, video, data, content, messaging (including SMS), etc. It is appreciated that call history may refer in a different manner to such different types of calls.

It is appreciated that the current location of the calling party (e.g., the location of the caller device) can be determined in many ways such as by using a GPS or by detecting the presence of a particular wireless communication network such as a cellular network, a wireless local area network (e.g., Wi-Fi), a wireless personal area network (e.g., a car Bluetooth), etc.

Reference is now made to FIG. 1, which is a simplified block diagram of a communication network 10 including a CLI configuring device 11 according to the dialed number, according to one embodiment of the present invention.

Communication network 10 may take any form and/or technology, including, but not limited to a telecommunications network, a wireless network, a land-line (telephone, PSTN) network, a mobile telephone network (Cellular, PLMN), a wide area network (WAN) such as the Internet, a cable network, a local area network (LAN), a personal area network (PAN), a wireless LAN, PAN, etc., a peer-to-peer network, etc., and any combination thereof.

As seen in FIG. 1, communication network 10 may include a plurality of communication networks 12, each of which can be any of the network type and technologies listed above, or a combination thereof. Communication network 12 may also be named here local network or native network or simply network 12. Networks 12 interconnect between themselves either directly or indirectly. As seen in FIG. 1, network 12 designated by numeral 13 interconnects between the rest of networks 12 and includes the CLI configuring device 11. However, one or more CLI configuring devices 11 can be included in any of networks 12.

As seen in FIG. 1, communication network 10 and/or communication networks 12 connect to terminal devices 14. Terminal devices 14 include a CLI receiving device and can be a free-standing CLI receiving device (not-shown) or a terminal including a CLI receiving device such as a telephone 15, a mobile telephone 16, a smartphone 17, a tablet or PDA 18, a laptop or notebook computer 19, a desktop computer 20, a computer or a network server 21 (such as a server of a call-center), etc.

It is appreciated that any terminal device 14 may also include a CLI configuring device 11, typically as an application, such as a software program executed by a processor of the terminal device 14. Herein, a CLI configuring device 11 included in communication network 10, and/or communication networks 12 and/or communication network 13, may be named 'central CLI configuring device 11', while CLI configuring device 11 included in a terminal device 14 may be named 'local CLI configuring device 11'.

Figure 2:
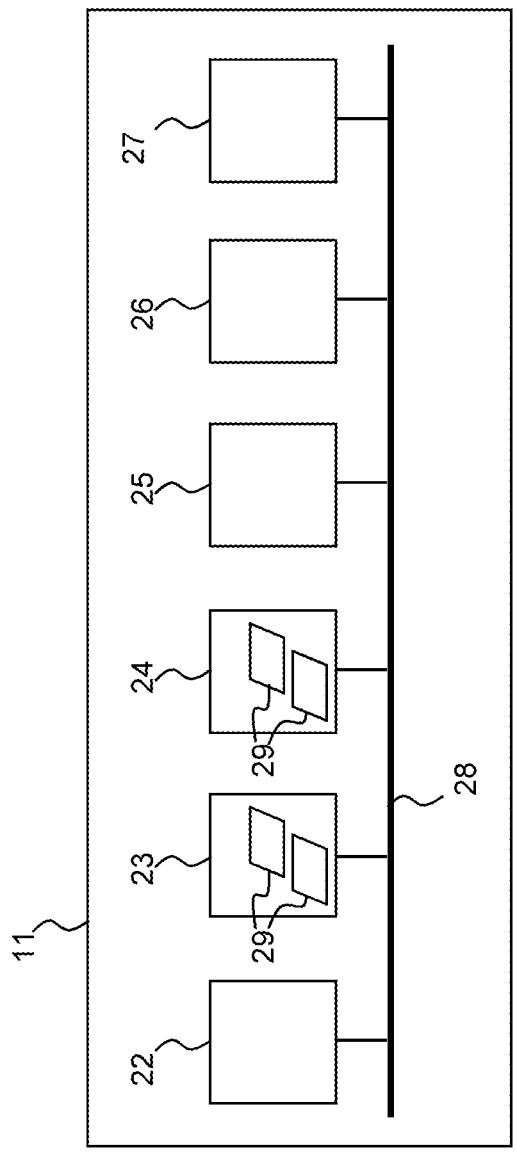
FIG. 2 is a simplified block diagram of a CLI configuring device.

Reference is now made to FIG. 2, which is a simplified block diagram of a CLI configuring device 11 according to one embodiment of the present invention.

CLI configuring device 11 is typically a computing facility or device executing a software program implementing a method for configuring a caller line identification (CLI). The CLI configuring device 11 may be embodied as a computer or a network server in a network 10 or 12, or as an application executed by a processor of a terminal device 14, or a combination thereof.

As seen in FIG. 2, the CLI configuring device 11, in accordance with one embodiment of the present invention, includes the following components:

At least one processor unit 22 for processing the software program implementing a method for configuring a caller line identification (CLI).

One or more memory units 23 [e.g., random access memory (RAM), a non-volatile memory such as a Flash memory, etc.] for storing software programs and data.

One or more storage units 24 including, for example, a hard disk drive and/or a removable storage drive, representing a floppy disk drive, a magnetic tape drive, a compact disk drive, etc. The removable storage drive reads from and/or writes to a removable storage unit in a well-known manner. The storage units 24 are used for storing software programs and data.

One or more communication units 25 for sending and/or receiving CLI messages and/or data.

One or more graphic processors 26 and displays 27 for displaying CLI data or related data.

One or more communication buses 28 (or any similar means) connecting the above units.

One or more computer programs 29, or computer control logic algorithms, and/or related data, which may be stored in any of the memory units 23 and/or storage units 24. Such computer programs, when executed, enable CLI configuring device 11 to perform various functions (to be set forth below, for example). Memory units 23 and/or storage units 24 and/or any other storage are possible examples of tangible computer-readable media.

As described above, CLI configuring device 11 can be incorporated in communication network 10 and/or in one or more communication networks 12, in one or more interconnecting communication network 13, in one or more terminal devices 14, etc. CLI configuring device 11 may also take the form of a software program executed by a processor of a server within communication network 10 and/or in one or more communication networks 12, or as an application executed by a processor of a terminal device 14.

It is appreciated that CLI configuring device 11 may be implemented as one or more network servers, as one or more network nodes, or in a cloud computing facility. It is appreciated that CLI configuring device 11 may be implemented as one or more mirroring sites for purposes such as backup, redundancy, load-sharing, etc.

It is appreciated that the functionality of a CLI configuring device 11 as described herein may be implemented in a single CLI configuring device 11 or in a plurality of CLI configuring devices 11 working together, or distributed between two or more CLI configuring devices 11. For example, some of the functionality may be embodied and/or executed and/or provided by one or more central CLI configuring devices 11, while other components of the functionality may be embodied, and/or executed and/or provided by one or more local CLI configuring devices 11.

Figure 3:
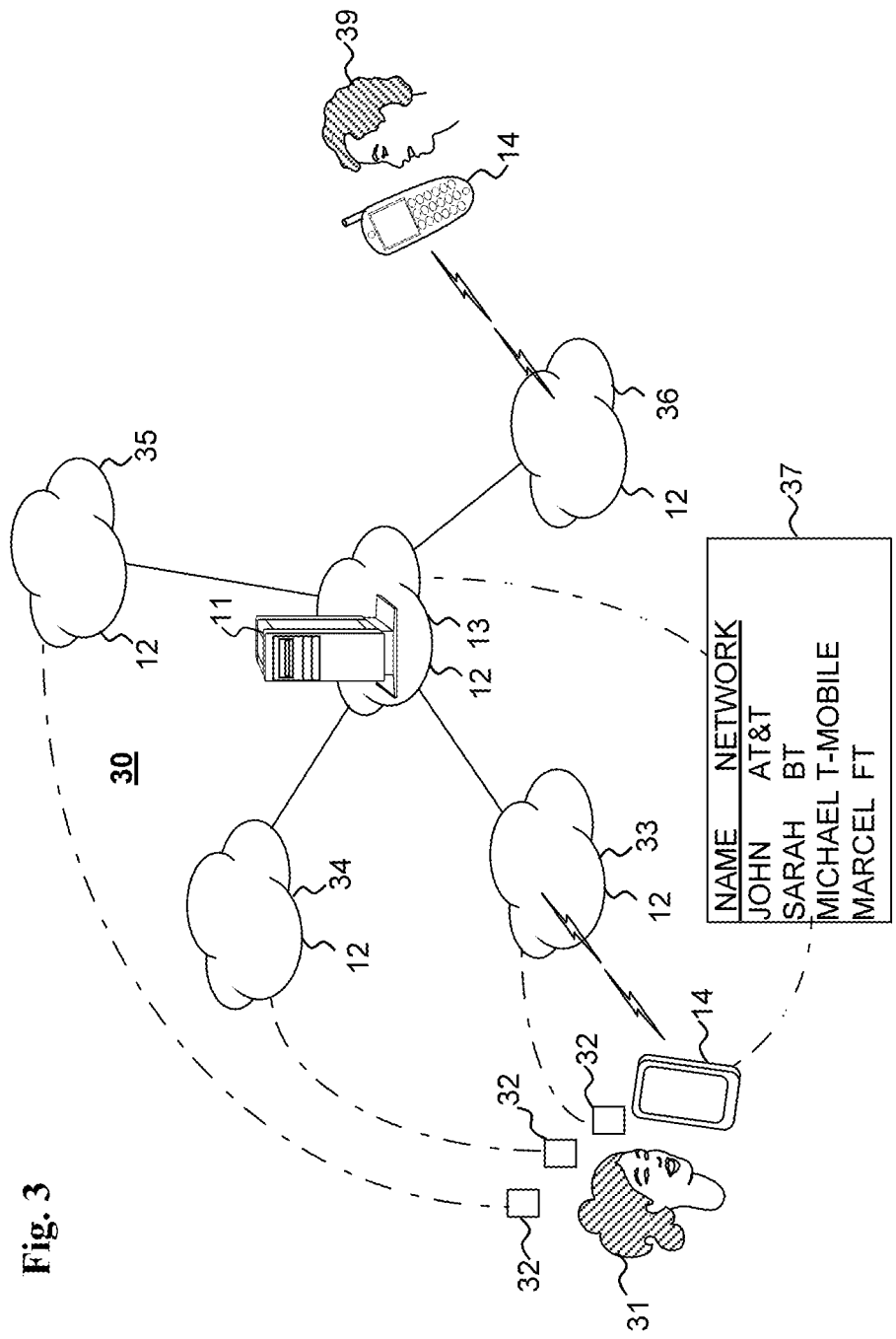
FIG. 3 is a simplified illustration of a first scenario implementing CLI configuration.

Reference is now made to FIG. 3, which is a simplified illustration of a first scenario 30 implementing CLI configuration according to a one embodiment of the present invention.

According to the scenario of FIG. 3, a user 31 has a plurality of subscriber identification modules 32 (SIM cards) issued by respective communication networks 12 designated by numerals 33, 34 and 35, respectively. The SIM cards 32 identify the terminal device 14 of the user 31 to the respective communication network 12. SIM cards 32 are typically issued by operator of cellular networks (e.g. PLMN) using wireless technologies such as GSM, LTE, CDMA, etc.

For example, user 31 travels intensively and therefore obtained SIM cards in several communication networks 12, each operating in a different part of the world. For example, User 31 has a SIM card 32 of AT&T for use in the USA, a SIM card 32 of BT (British Telecom) for use in Britain, a SIM card 32 of FT (France Telecom) for use in France. User 31 switches the SIM card 32 in the terminal device 14 according to the current location to use the local communication network 12.

It is appreciated that the use of a SIM card is an example for a method (or device) for associating a particular terminal device 14 with a particular communication network 12 and that any other method or device for associating a particular terminal device 14 with a particular communication network 12 is contemplated. For example, using the directory number of a regular land-line telephone as provided by the local switch (CO).

According to scenario 30 user 31 also subscribes to communication network 12 designated by numeral 13, which includes CLI configuring device 11. CLI configuring device 11 of communication network 13 maintains a list, or a database, of the SIM cards 32, and/or telephone numbers (directory numbers) of user 31 in the respective communication networks 12.

In the example of scenario 30 communication network 13 enables the user to upload her phone book from terminal device 14 to the database of CLI configuring device 11 and then select for each phonebook entry (called entity) a network 12, or the SIM card of a network 12, or the telephone number associated with the SIM card of a network 12, (or a telephone number associated with a land-line), etc.

It is appreciated that communication network 13 is typically a low-cost international carrier. In this respect communication network 13 provides the calling user (user 31) a method of communication with the called party (user 39) that is less costly than, for example, by network 33 connecting directly with the called party network 12) designated by numeral 36). To make use of communication network 13 user 31 may execute any of the following access methods:

Call an access number of communication network 13 in network 33 and then dial the destination number (the telephone number of the terminal device 14 of user 39). The destination number is typically sent to communication network 13 as a series of dual-tone multi-frequency (DTMF) digits.

Invoke a callback session, for example by calling an access number of communication network 13 in network 33 and disconnecting the call before or after it is answered. After receiving the callback call user 31 dials the destination number.

Send a data or text message to communication network 13, for which communication network 13 responds by calling user 31. This data or text message can take the form of a short message service (SMS), an unstructured supplementary service data (USSD), a message sent over an IP channel, etc. The data or text message typically include the telephone number of the calling party. After receiving the callback call user 31 dials the destination number. Alternatively, user 31 enters the destination number into the data or text message.

Use a software program in the terminal device 14 (client application) to initiate the call, typically executing any of the above examples or variations thereof. Typically, user 31 uses the client application to send the destination number to communication network 13.

Access communication network 13 via a data network such as the Internet. The data network can be any network such as land-line connection (e.g. Ethernet), wireless Internet connection (e.g. WiFi), cellular Internet connection, etc. Typically, user 31 then sends the destination number to communication network 13 using.

It is appreciated that communication network 13 may receive the destination number from network 33 or directly from user 31 using an access method such as listed above.

For example, as seen in FIG. 3, communication network 13 presents on the display of the terminal device 14 of user 31 a screen display 37 enabling the selection of a network for each phonebook entry. Alternatively, an application (e.g. a software program) operating in terminal device 14 collects these selections of user 31. The application in terminal device 14 can maintain the list, or database, of user selections (associating phonebook entries with SIM cards, or networks, or telephone numbers of user 31 internally in a list, table, or database which is part of the application, or upload it to the CLI configuring device 11 in communication network 13.

The methods described above may be applicable to various types of streaming media communication such as voice (regular telephone call), video, multimedia, etc. The methods described above may additionally be applicable to various types of messaging, store-and-forward, and similar types of communication such as communication types not requiring streaming media or continuous communication. Messaging and store-and-forward communication may include voice messages, text messages including short message service (SMS), and instant messaging, messages or other types of content including images and graphics, video messaging, multimedia messaging, etc. Therefore, the term CLI configuration may refer to any type of identification code used to identify the caller device (or the calling user) to the called device (or the called user).

Messaging services such as SMS may generate an identification code at the caller (or calling) device. The identification code may be a part of the message, or message header. Accordingly, a CLI configuring device 11 may reconfigure the identification code of a message or a similar content delivered from a calling (caller) device to a called device in a number of ways as disclosed below.

For example, a user may select an identification code from a plurality of available identification codes to be embedded in the message, or the message header. A user may use the messaging client software to make the selection of the identification code.

Alternatively, the user may use an application software program (other than the client messaging software) performing as a local CLI configuring device 11 to select the identification code and embed it in the message, or the message header.

Alternatively, the user may use the application software program (such as the local CLI configuring device 11) to select the identification code and instruct a central CLI configuring device 11 residing in communication network 13 to replace the identification code provided by the client messaging software with the selected identification code.

The local CLI configuring device 11 may send the instruction to the central CLI configuring device 11 via a communication channel that is different from the communication channel used by the client messaging software to send the message, for example, to make sure that the central CLI configuring device 11 receives the instruction in time (e.g. before the message is forwarded).

For example, an SMS message may carry a default caller identification code as a part of the SMS message, usually within the SMS message header. The SMS is sent to the communication network 10 (operating the CLI configuring device 11) to be forwarded to the called device. At the same time, the local CLI configuring device 11 (embedded in the caller device) sends to the communication network 10 (operating the CLI configuring device 11) a different and preferred caller identification code via another communication channel, such as the IP channel. The CLI configuring device 11 of the communication network 10 then replaces the caller identification code embedded in the SMS message header with the preferred caller identification code received via the IP channel. Then the communication network 10 forwards the SMS message (with the preferred caller identification code in its message header) to the called device.

The user may provide the central CLI configuring device with the set of plurality of identification codes and one or more rules for selecting an appropriate identification codes (as disclosed below) so that the central CLI configuring device may automatically determine a suitable identification code and replace the identification code provided by the client messaging software with the selected identification code.

The user may provide the central CLI configuring device with the set of plurality of identification codes and one or more rules for selecting an appropriate identification codes using a mobile application (e.g. a software program downloaded to the caller device) or by directly accessing the central CLI configuring device.

It is appreciated that the various methods described above, using a central CLI configuring device 11 and/or a local CLI configuring device 11 to determine, set and/or replace the identification code of the caller device, are not mutually exclusive and can be used together and/or in various combinations.

For example, the user may set the central CLI configuring device 11 to determine the identification code and still use the local CLI configuring device 11 to set a particular identification code in a particular situation. In such case, for example, the local CLI configuring device 11 may send to the central CLI configuring device 11 an instruction not to replace the identification code set by the local CLI configuring device 11. This instruction may be sent as a part of the message (or the message header, for example as a code hidden within the identification code. Alternatively, the instruction may be sent via a different channel directly to the central CLI configuring device 11.

It is appreciated that when the central CLI configuring device 11 is provided by a communication network 12 performing as an interconnecting (intermediating) communication network 12 such as communication network 13 of FIG. 3 the instruction sent from the local CLI configuring device 11 to the central CLI configuring device 11 (in any mode of operation such as streaming, messaging, etc.) may be sent via a communication channel bypassing the communication network 12 directly serving the caller device.

Reference is now made to FIG. 4, which is a simplified illustration of a CLI allocation table 38 according to one embodiment of the present invention.

CLI allocation table 38 represents an example of the CLI conversion database maintained by the CLI configuring device 11 (whether implemented within communication network 13 or within an application executed by terminal device 14). As seen in FIG. 4, CLI allocation table 38 lists the following entries:

Names of called entities (in the column titled NAMES).
A telephone number (directory number) for each called entity (in the column titled TELEPHONE)
CLI data to be used for each called entity (in the column titled CLI).
CLI Identification name of the CLI, typically by indicating the name of network 12 that has issued the SIM card associated with the CLI (in the column titled NETWORK).

The CLI identification name is provided to help the user to select the CLI to be used for the particular dialed entity. The user may replace the CLI identification name with any other useful name, for example in case the user's directory number (i.e. the CLI) is ported to another operator.

For the purpose of scenario 30, CLI allocation table 38 belongs to (or associated with) user 31. Returning to FIG. 3 and scenario 30, user 31 now dials to a second user designated by numeral 39, using the SIM card 32 of communication network 33, which, for the example of scenario 30, is AT&T. User 31 is Sarah as indicated in CLI allocation table 38. The call is transferred to communication network 13 indicating the dialed number, which according to this example is +44-131-243-0661. In communication network 13 the CLI configuring device 11 uses the dialed number (+44-131-243-0661) to locate the record for Sarah, and then replaces the CLI received from AT&T with the CLI as indicated by the record for Sarah (in this example the new CLI would be 7-014-223-846). Communication network 13 then forwards the call to the destination communication network 12 (to which Sarah subscribes) with the new CLI (7-014-223-846). Thus, the CLI configuring device 11 has configured the CLI to a characteristic of the called party (e.g. according to the dialed number). In this respect the characteristic of the called party is set by the calling user.

In scenario 30 the CLI is configured according to the network 12 of preference of the called party. For example, the network of preference is a network 12 operating in the locality of the called party (user 39). Proving the called party (user 39) a local number for return call may encourage the user to call the calling party.

In a second scenario, the calling party (user 31) instructs the CLI configuring device 11 to use the AT&T CLI as the default CLI independently of the SIM card used. In this scenario, user 31 travelled from the USA to the United Kingdom and is now using a SIM card of a UK communication network 12 to dial a telephone number of user 39 located in France and using a telephone number of a French communication network 12.

The call is forwarded by the UK network 12 to communication network 13 in which CLI configuring device 11 interrogates the database for user 31 and accordingly replaces the CLI provided by the UK operator with the CLI provided by AT&T. Communication network 13 then forwards the call to the French network 12. The telephone (terminal devices 14) of user 39 now interrogates its phonebook and if the CLI matches a telephone number then the telephone of user 39 displays the name of user 31 as associated with the CLI.

In this case of the second scenario, the CLI configuring device 11 always uses the same (default) CLI, irrespective of the SIM card used by the calling user (user 31). Thus, the called party can recognize the caller irrespective of the SIM card used. Thus, the CLI configuring device 11 configures the CLI to a characteristic of the calling party. In this respect the characteristic of the calling party is determined automatically by the CLI configuring device 11 according to the calling history of user 31.

Continuing with the second scenario, the called party (user 39) now returns a call to user 31 by using the received CLI (the AT&T number). The call is transferred to communication network 13 that recognizes that for the particular user (user 31) the AT&T number is a default number. Communication network 13 therefore scans its database (call history) and forwards the call to the UK network 12. For example, the UK network 12 is selected because it is the telephone number associated with a latest call made or received by user 31. It is noted that communication network 13 identifies and forwards the call to the called person (user 31) rather than to the called number (the AT&T number).

It is appreciated that the calling user can set different default CLIs to different called parties. In this the second scenario uses a CLI allocation table that looks like CLI allocation table 38 of the first scenario (scenario 30) except that the CLI is based on a combination of characteristics of the calling party and the called party.

In a third scenario, user 31 is traveling between countries, using local SIM cards to call local people. Consequently, each called party knows the local number (or local SIM card) of user 31. In this respect, when a call from user 31 is received, the telephone (terminal devices 14) of the called user recognizes the CLI associated with the local SIM card and display the name of user 31. Therefore, when calling a user 39, irrespective of the SIM card used, the CLI configuring device 11 replaces the CLI with the CLI as known be the called party (user 39). For the purpose of the third scenario, CLI configuring device 11 maintains for each calling user (user 31) a list (such as CLI allocation table 38) in which for each called party (e.g. user 39) CLI configuring device 11 records the CLI of preference. For example, CLI configuring device 11 records the first CLI presented to the particular called party. Thus, the CLI configuring device 11 configures the CLI to a characteristic of the called party (e.g. according to the dialed number). In this respect the characteristic of the called party is determined automatically by the CLI configuring device 11 according to the calling history of user 31.

In a fourth scenario the called number is not known to CLI configuring device 11. That is, CLI allocation table 38 has no entry for the dialed number. However, CLI configuring device 11 includes a rule by which the CLI should be configured according to a characteristic of the called number. In this respect, the characteristic is a geographical location, a country code, an area code, a prefix code identifying a communication network 12, a network functional range, etc. The rule (similar to CLI allocation table 38) defines a CLI to be used automatically when the called number is characterized as detailed above. The CLI configuring device 11 configures the CLI according to the characteristic of the called party, e.g. according to the characteristic of the dialed number. In this respect the characteristic of the called party is determined automatically by the CLI configuring device 11 according to a table of dialed number prefixes (e.g. a country code, an area code, a prefix code identifying a communication network 12, etc.).

In a fifth scenario, the calling party (user 31) is not using any of her SIM cards 32. For example, user 31 is travelling in a country where she does not have a SIM card of a local communication networks 12 and therefore uses a local telephone such as a telephone in a hotel room or a payphone. For example, user 31 dials a local access number of communication network 13 (as a call forwarding service, callback service, VoIP service, etc.) and then dials the number of the called party. The CLI configuring device 11 of communication network 13 configures the CLI sent to the terminal devices 14 of the called party according to any of the characteristics indicated in the previous scenarios. For example, according to the characteristics of the called party as set by user 31, according to the locality of the called party, according to a default CLI as set by user 31, according to the telephone number (SIM card) of user 31 that is known to the called party, etc.

In a sixth scenario user 31 has a private access number in country A. A calling party, such as user 39, residing or travelling in country A calls user 31 by dialing the private access number at the cost of a local call. The call is received by the communication network 12 of country A, then transferred by communication network 12 of country A to communication network 13, which then transfers the call to the communication network 12 currently servicing user 31 in country B. The CLI configuring device 11 of communication network 13 records the details of this call including the dialed number (being the access number). User 31 may receive the call or, if unavailable, user 39 may leave a message such as a voice message or a text message (e.g. SMS). The terminal devices 14 now has the CLI of user 39.

Thereafter, user 31 returns the call of user 39 by dialing the CLI of user 39. The call is transferred to communication network 13 in which CLI configuring device 11 configures the CLI of user 31 sent to the terminal devices 14 of user 39 according to the access number used by user 39. Therefore, CLI configuring device 11 configures the CLI according to a characteristic of the called party, the characteristics, for example, being the number dialed (DNIS) by the called party in a previous call made by the called party to the calling party.

In a seventh scenario user 31 calls user 39 in country B where communication network 13 has an access number. CLI configuring device 11 configures the CLI of user 31 sent to the terminal device 14 of user 39 by appending the access number of communication network 13 in country B with the telephone number of user 31. Thereafter, when user 39 wishes to call user 31 user 39 may recall the CLI from the memory of his terminal device 14 which then dials the access number of communication network 13 in country B followed by the telephone number of user 31

It is appreciated that combining the access number of communication network 13 in country B with the telephone number of user 31 can take place in a CLI configuring device 11 of communication network 13 (when the call reaches communication network 13 (using any of the access methods described above). Alternatively combining the access number of communication network 13 in country B with the telephone number of user 31 can take place in a CLI configuring device 11 being a part of a client software of terminal device 14 of the calling party (user 31).

Figure 5A:
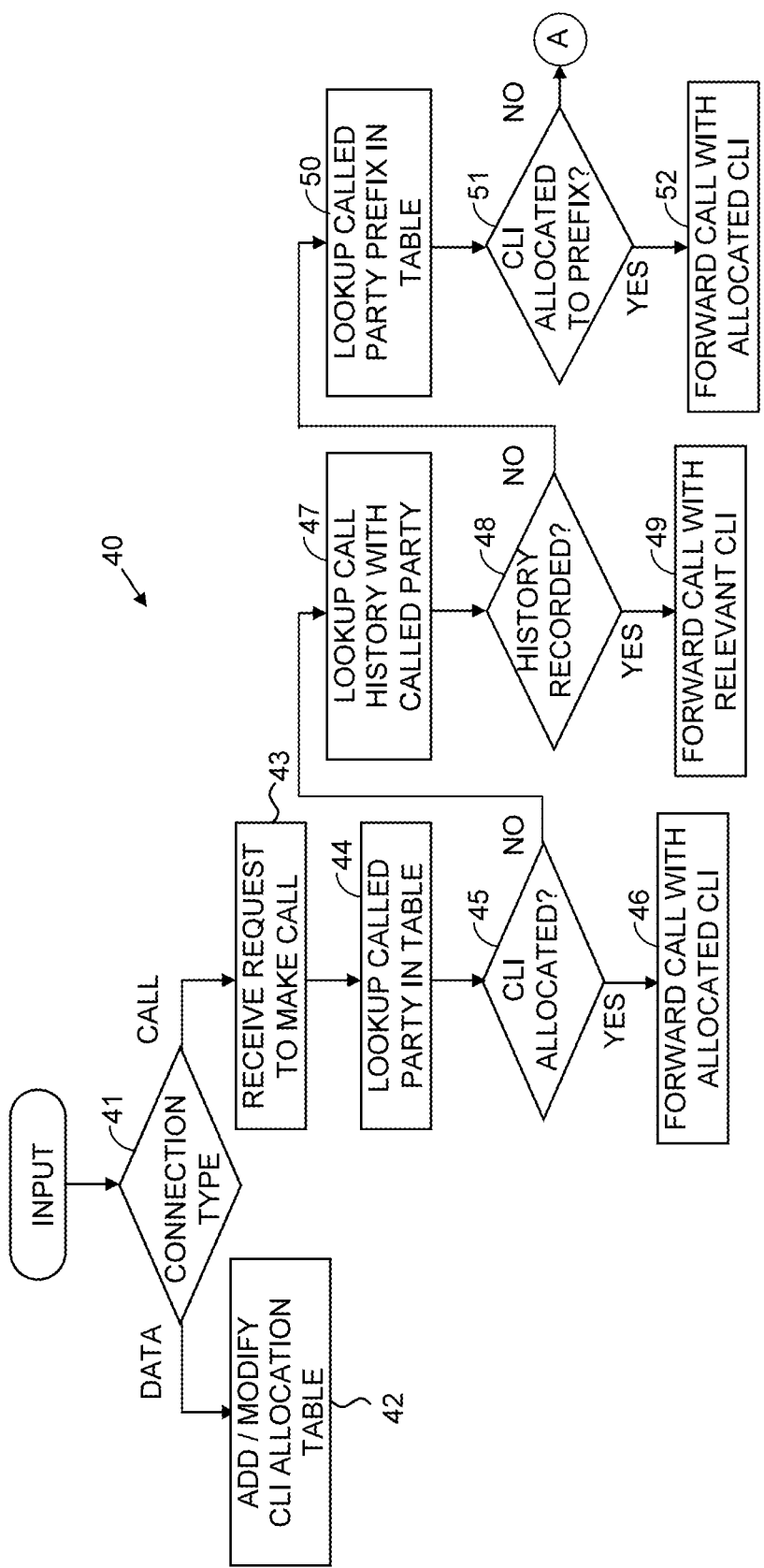
FIGS. 5A and 5B taken together are a simplified block diagram of CLI configuring process.
Figure 5B:
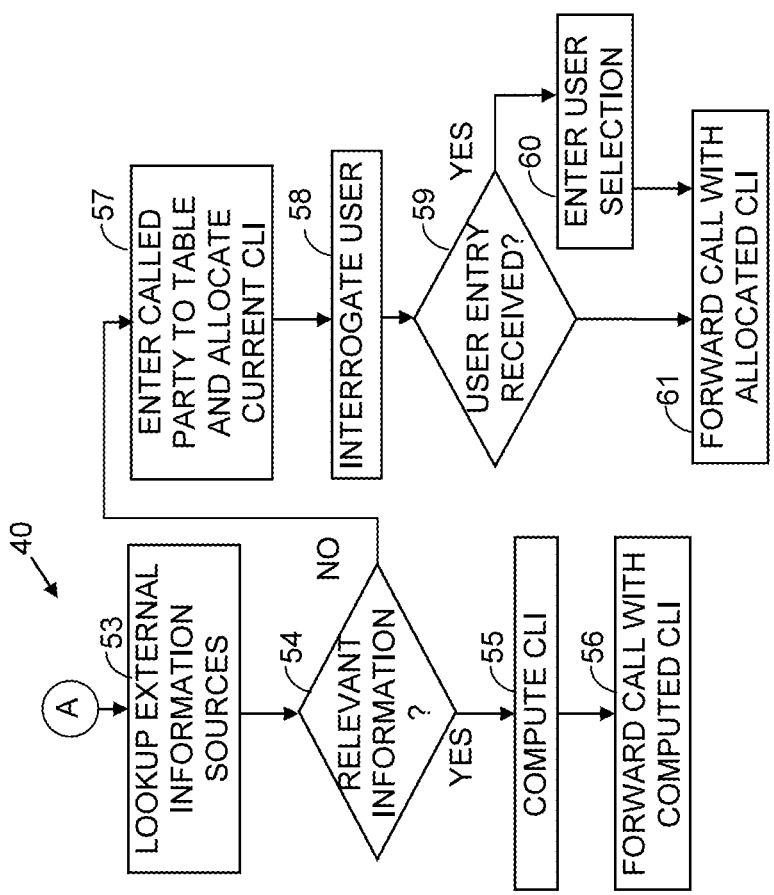

Reference is now made to FIG. 5A and FIG. 5B, which taken together are a simplified flow-chart of CLI configuring process 40, according to one embodiment of the present invention. It is appreciated that CLI configuring process 40 can be executed by processor unit 22 of CLI configuring device 11.

As seen in FIGS. 5A and 5B, CLI configuring process 40 may start by receiving a communication. The communication may be in any form such as a telephone call (including voice, multimedia, video, SMS, etc.) and/or data communication (e.g., using Internet protocol). These two forms of communication may be received via the same communication channel or via different communication channels. Additionally, these two forms of communication may be received by the same module of the CLI configuring device 11, or by different modules. In step 41 CLI configuring process 40 may determine the type of the communication.

For example, CLI configuring process 40 may determine if the communication is of a data type or a call type. A data communication may be received over a data network such as an Internet protocol channel (IP). A call type communication may be received over a telephony channel (e.g., a telephony network such as PSTN, PLMN, cellular network, GSM, LTE, etc.).

If the communication is a data communication it may be received from a web server or from a mobile application executed by a mobile device such as a smartphone. Such data communication may contain information pertinent to CLI reconfiguration and particularly to the CLI allocation table 38. Such communication data may contain a new entry (cell, record) of CLI allocation table 38, or a modification of an existing entry, or a selection of an entry for a particular call. For example, a currently active call or a call about to be made.

For example, the data communication may carry a caller identification code provided by a CLI configuring device 11 embedded in the caller device instructing the central CLI configuring device 11 operative in the communication network 10 to reconfigure the caller identification code of a message being currently sent via the communication network 10 to a called device. Such message may be, for example, an SMS message arriving at the communication network 10 via a different channel, namely the telephony channel.

In such case the data communication processed by CLI configuring process 40 may include the telephone number or a similar identification of the calling device as currently used, the selected caller identification code, and an identification, such as a telephone number, of the destination device (the called device). The data communication may also include data for identifying a particular message. The data communication may also include data regarding one or more conditions by which the selected caller identification code should be used.

If the communication received is of the data type as described above CLI configuring process 40 may proceed to step 42 to enter the data into the CLI allocation table 38 or any other form of memory available for retrieval at a later step.

If the communication received is of the call type CLI configuring process 40 may proceed to step 43. The call communication received may be, for example, a request to make a call, received, for example, by CLI configuring device 11 of a communication network 12 such as communication network 13. The call request may include a destination number for the called party. Alternatively, or additionally, the call request may include a request to forward a message, such as an SMS message.

Configuring process 40 may then proceed to step 44 to search the called party in a lookup table (or list or database) such as CLI allocation table 38 of FIG. 4. Typically, Configuring process 40 may search the called party according to the destination number received in step 43. If the destination number is found in the lookup table (step 45) then configuring process 40 may proceed to step 46 to forward the call with the CLI allocated to the called party in the lookup table.

If the lookup table does not store the called (destination) number or an allocated CLI then configuring process 40 may proceed to step 47 to lookup the call history lookup table (or list, or database) for the called party. For example, if a call has been received from the called party to any particular telephone number (e.g. another SIM card) of the calling user. If the destination number is found in the call history lookup table (step 48) then configuring process 40 may proceed to step 49 to forward the call with the CLI derived from the call history lookup table. For example, the CLI for the number dialed by the called party in the last call received from the called party.

If the call history lookup table does not store the called (destination) number or an allocated CLI then configuring process 40 may proceed to step 50 to lookup the prefix lookup table (or list or database) for the called party. For example, if the telephone number to be dialed begins with a string of digits matching a prefix in the prefix lookup table such as a country code or an area code. If a prefix is found in the call history lookup table (step 51) then configuring process 40 may proceed to step 52 to forward the call to the destination (called) number with the CLI derived from the prefix lookup table. For example, the CLI associated with a SIM card issued by a network 12 serving, or geographically co-located with, the destination (called) telephone number.

If the prefix lookup table does not store a CLI applicable to the called (destination) number then configuring process 40 may proceed to step 53 to obtain information from an external sources as determined by the user by setting applicable rules. For example, information regarding a mutual interest or a social connection. If such external information is found (step 54) then configuring process 40 may proceed to step 55 to compute a CLI according to the external information and applicable rules that the user has set up in advance. Configuring process 40 then uses this CLI when forwarding the call to the destination (called) number (step 56).

If configuring process 40 does not find a relevant external information it may proceed to step 57 to enter the destination (called) number into the CLI lookup table with the current (or default) CLI. Configuring process 40 may then proceed to step 58 to interrogate the user whether the user wishes manipulate the CLI. Typically step 58 offers the user CLI manipulation options such as:

Setting a CLI, for example, if no CLI is determined,
Amending the CLI, for example, by setting a priority or an urgency flag, etc.
Replacing the CLI with a different CLI such as a CLI of a different SIM card, typically be selecting such CLI from a table similar to CLI allocation table 38.

If a user entry is received (step 59) then the user selection is entered as the CLI to be used (step 60). Configuring process 40 may then proceed to step 61 to forward the call to the called party with the selected CLI.

It is appreciated that any of steps 46, 49 52, and 56 may include sub-steps for interrogating the calling user such as steps 58 to 61. For example, CLI configuring device 11 may compute any number or selection of possible CLI values such as the CLI values composed in the scenarios detailed above, and then present these CLI values to the user, enabling the user to select a CLI to be sent to the called terminal device.

It is appreciated that interrogating a user may be embodies as part of the called-party terminal devices 14 (e.g. a local CLI configuring device 11), or by CLI configuring device 11 within communication network 13 (e.g. a center CLI configuring device 11), or any combination thereof.

It is appreciated that the order of CLI selections as described with reference to FIG. 5 is arbitrary.

It is appreciated that a CLI can be selected as described with reference to FIG. 5 to invoke a particular ringing signal (such as a ring tone) in the destination (called) terminal devices 14.

As described above, CLI configuring device 11 configures a CLI for sending to the called party terminal device 14 using one or more of the following methods:
By selecting a CLI from a table such as CLI allocation table 38.
According to one or more rules.
By enabling the calling party to select a CLI
Any combination thereof.

CLI configuring device 11 configures a CLI for sending to the called party terminal device 14 using any of the following characteristics:

Using a network of preference as predetermined by the calling party for the particular called party (first scenario). The network of preference is typically a network to which the calling user subscribes or has a SIM card issued by the network or otherwise has a telephone number of that network. This characteristic is an example of table-based called party characteristic.

Using a default (base) network as predetermined by the calling party, with an option to define a different default network for different called party (second scenario). The default network is typically a network to which the calling user subscribes or has a SIM card issued by the network or otherwise has a telephone number of that network. This characteristic is an example of table-based calling party characteristic, or a combination of calling and called party characteristics.

Using the call history with the particular called party. Typically by selecting a CLI associated with the first or the last network from which a call was made to the particular called party. (Third scenario). The calling user subscribes or has a SIM card issued by the selected network or otherwise has a telephone number of that network. This characteristic is an example of a rule-based CLI selection that can thereafter be maintained in a CLI allocation table.

According to the location of the called party or prefix of the dialed number (fourth scenario). The calling user subscribes or has a SIM card issued by the selected network or otherwise has a telephone number of that network. This characteristic is an example of a rule-based CLI selection that can thereafter be maintained in a CLI allocation table.

All or any of the above when using a random telephone line, mobile telephone, or internet connection instead of a personal telephone or SIM card (fifth scenario).

According to a private access number of the calling party that has been used by the called part in a previous call (sixth scenario). This characteristic is an example of a rule-based CLI selection, using called party characteristics, which may thereafter be maintained in a CLI allocation table.

Using a network access number effective in the called party's county or area, as provided by the calling party (seventh scenario). Typically by appending the network access number in front of the CLI of the calling party. The CLI of the calling party may be selected according to any of the previous scenarios. This characteristic is an example of a rule-based CLI selection, using called party characteristics, which may thereafter be maintained in a CLI allocation table.

Figure 6A:
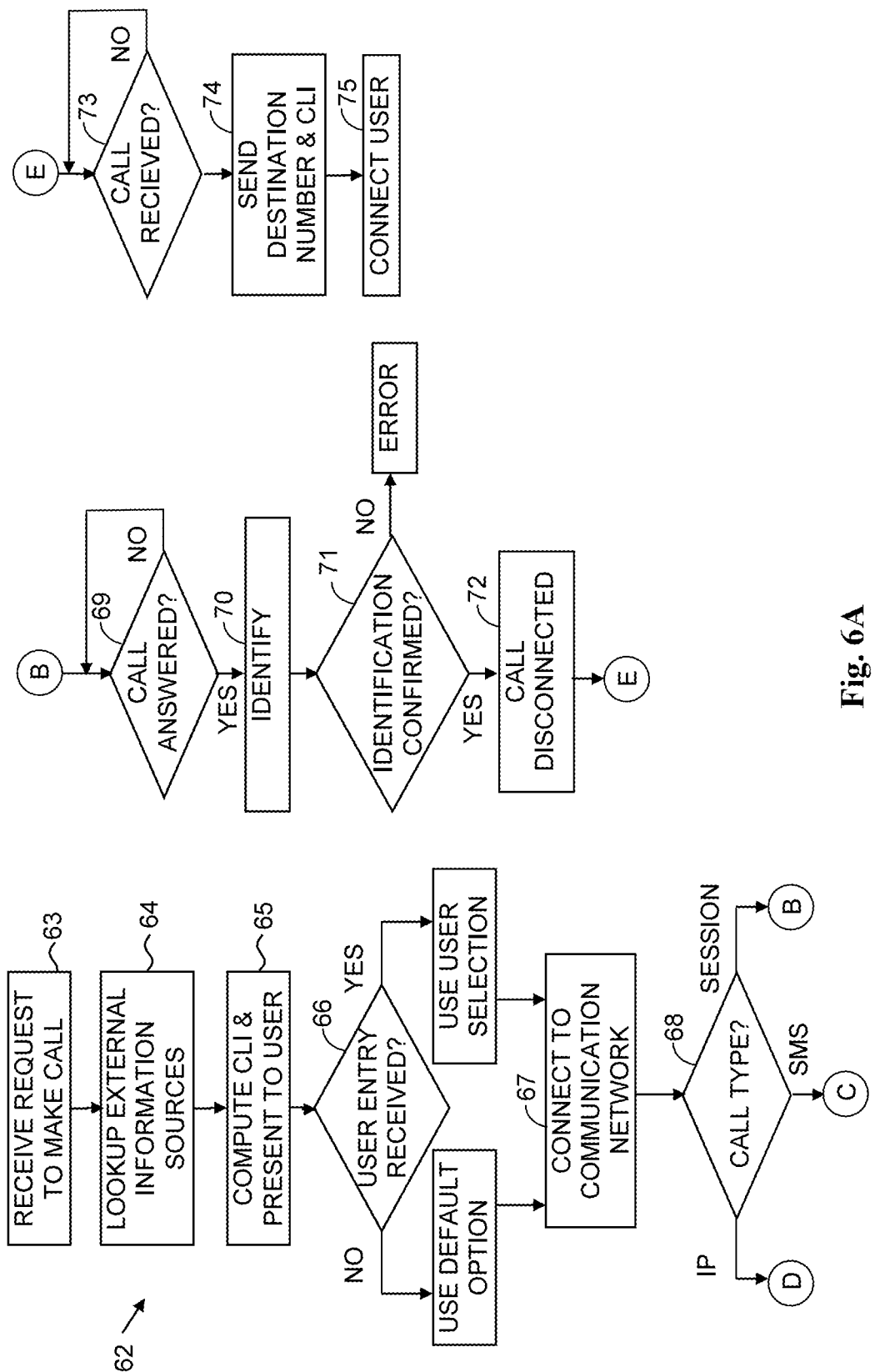
FIGS. 6A and 6B taken together are a simplified flowchart of a call control process including a CLI configuring process.
Figure 6B:
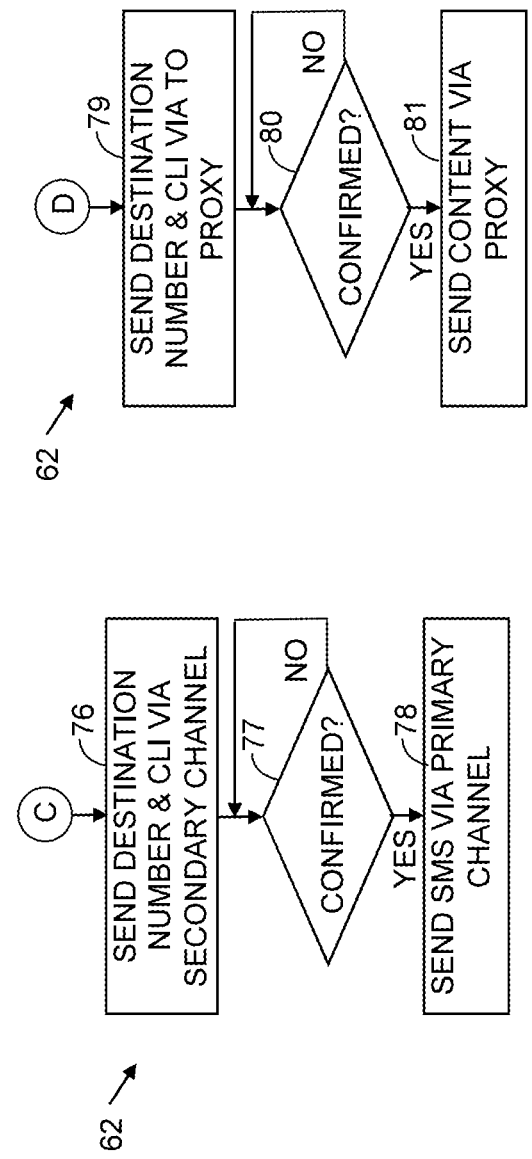

Reference is now made to FIGS. 6A and 6B, taken together are a, simplified flowchart of a call control process 62 according to one embodiment of the present invention.

In an eighth scenario, the calling party (user 31) uses a terminal device 14 such as a smartphone with a call control application. The call control may be an application, or client software, which is a software program loaded into the terminal devices 14 and executed by a processor of the terminal devices 14. The call control includes a CLI configuration software such as the software of CLI configuring device 11. This scenario is an example of a CLI configuration process that is handled partly by an application executed in the called-party terminal devices 14 (e.g. a local CLI configuring device 11), and partly by CLI configuring device 11 within communication network 13 (e.g. a center CLI configuring device 11).

In the eighth scenario, the calling party (user 31) may use the call control application to connect to communication network 13 using any of the access methods described above. For example, as shown in FIG. 6, the call control application executes the following steps:

In step 63 of call control process 62 typically receives a destination telephone number from user 31. The call control application may then proceed to step 64 to analyze the called number (or party), to lookup external information resources, and to compute a CLI (step 65). Analyzing the called number may be according to any of the scenarios described above. External resources may include information provided by the terminal device 14 such as local coordinates provided by a location device such as a Global Positioning System (GPS), ambient temperature, motion parameters, etc. The external data, such as data received from external sources or external resources may include any type of biological or biometric data such as heart bitrate, skin conductivity, ECG, body temperature, blood pressure, glucose level, etc. The CLI may be associated, in the called device, with an emergency ringtone or another type of emergency notification. The CLI may therefore include a telephone number followed by external data as described above.

The call control application may then proceed to step 66 to display to user 31 one or more of the computed CLIs, enabling user 31 to confirm the computed CLI, and/or select a CLI, and/or enter a CLI.

The call control application may then proceed to step 67 to connect to communication network 13 according to the type of call (step 68). There may be any number of types of call, of which FIG. 6 shows three examples:

A 'session" type call (designated by the letter 'B') refers, for example, to a regular telephone call, a streaming session which may include voice, video, multimedia, etc., including conferencing.

An 'SMS" type call (designated by the letter 'C') refers to short messaging service (SMS) and any similar messaging and/or store and forward of any type of content using telephony communication technology such as PSTN, PLMN, GSM. LTE, etc.

An 'IP" type call (designated by the letter 'D') refers to communicating any type of data and/or content and/or message, including text, image, video, multimedia, etc., using any data communication network such as Internet protocol (IP). For example any communication channel that is different from the communication channel used for the 'session' and 'SMS' call types.

If the call is a 'session' type call, call control process 62 may dial a telephone number of the destination device and proceed to step 69 to wait until it detects communication network 13 answering the call (for example by detecting a DTMF string).

The call control application may then proceed to step 70 to identify the caller to communication network 13. The identification is typically executed by sending identification data such as user ID and/or password, for example as a string of DTMF signals. If the identification is confirmed (step 71) the call is disconnected (step 72) and communication network 13 then dials back to the called-party terminal device 14. It is appreciated that this process creating a callback session is but an example of one possible access method and other processes are contemplated. For example, any of the access method described above.

The call control application may then proceed to step 73 to wait for a callback call from communication network 13. When the call is received call control application sends to communication network 13 the destination number (e.g. the telephone number of user 39) and the CLI (step 74) to be sent to the called-party terminal devices 14. The call control application then connect the caller (step 75).

As seen in FIG. 6B, if in step 68 the call type is SMS or a similar type of call, the call control application may then proceed to step 76 to send the identification of the called device (e.g., the destination number) and the selected caller identification code (e.g., the selected CLI) to the central CLI configuring device 11 within communication network 13 via a secondary channel. The secondary channel may be any channel different from the primary channel. The primary channel may be any channel used to send the SMS or the message or content of the SMS call type. The primary channel may be PSTN, PLMN, LTE, etc. The secondary channel may be a data communication channel such as using Internet Protocol (IP).

When the call control application receives confirmation from the central CLI configuring device 11 (step 77) the call control application may proceed to step 78 to create and send the SMS (or any similar content).

If in step 68 the call type is IP or a similar type of call, the call control application may proceed to step 79 to send the identification of the called device (e.g., the destination number) and the selected caller identification code (e.g., the selected CLI) to the central CLI configuring device 11 within communication network 13 via a secondary channel.

When the call control application receives confirmation from the central CLI configuring device 11 (step 80) the call control application may proceed to step 81 to create and send the data or content to the destination device via the CLI configuring device 11 acting as a proxy.

It is appreciated that certain features of the invention, which are, described in the context of different embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

What is claimed is:

1. A method for identifying a calling party to a called party in an integrated communication network, wherein said integrated communication network includes a plurality of native communication networks, wherein said calling party subscribes to at least two native communication networks, the method comprising:
    obtaining a plurality of caller identification codes for said calling party, wherein each of said caller identification codes identifies said calling party in at least one of said native communication networks;
    upon initiating a communication between said calling party and said called party, executing the steps of:
        selecting a caller identification code from said plurality of caller identification codes according to a characteristic; and
        forwarding said selected caller identification code to at least one of another communication network, and a called device,
    wherein said characteristics is associated with content obtained from an external source associated with at least one of said calling party and said called party, and wherein said external source is:
        external to a caller device used by said calling party,
        external to said called device,
        external to said communication network to which the caller device subscribes, and
        external to said another communication network to which said selected caller identification code is forwarded.

2. The method according to claim 1 wherein said content is derived from call history of at least one of said calling party and said called party, and
    wherein said call history content is external to said caller device, said called device, said communication network to which the caller device subscribes, and said another communication network.

3. The method according to claim 2 wherein at least one of said content and said call history is associated with a type of a previous communication between said calling party and said called party.

4. The method according to claim 1 wherein said caller identification code includes at least part of said content obtained from said external source.

5. The method according to claim 1 wherein said step of selecting a caller identification code from said plurality of caller identification codes according to content obtained from an external source is performed by a software program operating in said caller device; and additionally comprising forwarding said selection from said caller device to a communication device connecting said caller device with said called device.

6. The method according to claim 5 wherein said step of forwarding said selection from said caller device to said communication device connecting said caller device with said called device is performed in a communication channel that is different from the communication channel used for connecting said caller device with said called device.

7. The method according to claim 1 wherein said communication between said calling party and said called party comprises a message.

8. A computer program product embodied on a non-transitory computer readable medium, said computer program product including instructions that, when executed by at least one processor, cause the at least one processor to perform operations comprising:
   maintaining a plurality of caller identification codes for a calling party, wherein each of said caller identification codes identifies said calling party in at least one communication networks in an integrated communication network, wherein said integrated communication network includes a plurality of communication networks;
   identifying said calling party to said called party upon initiating a communication between said calling party and a called party, wherein said calling party and said called party are connected to different communication networks, executing the steps of:
     selecting a caller identification code from said plurality of caller identification codes according to a characteristic; and
     forwarding said selected caller identification code to at least one of another communication network, and a called device,
   wherein said characteristics is associated with content obtained from an external source associated with at least one of said calling party and said called party, and wherein said external source is:
     external to a caller device used by said calling party,
     external to said called device,
     external to said communication network to which the caller device subscribes, and
     external to said another communication network to which said selected caller identification code is forwarded.

9. The computer program product according to claim 8 wherein said content is derived from call history of at least one of said calling party and said called party; and
   wherein said call history content is external to said caller device, said called device, said communication network to which the caller device subscribes, and said another communication network.

10. The computer program product according to claim 9 wherein at least one of said content and said call history is associated with a type of a previous communication between said calling party and said called party, and
   wherein said call history content is external to said caller device, said called device, said communication network to which the caller device subscribes, and said another communication network.

11. The computer program product according to claim 8 wherein said caller identification code includes at least part of said content obtained from said external source.

12. The computer program product according to claim 8 wherein said plurality of caller identification codes is stored in said caller device, and wherein said step of selecting a caller identification code from said plurality of caller identification codes is performed by a computer program product operating in said caller device; and
   additionally comprising instructions that, when executed by at least one processor, cause the at least one processor to forward said selection from said caller device to a communication device connecting said caller device with said called device.

13. The computer program product according to claim 12 wherein said step of communicating said selection from said caller device to said communication device connecting said caller device with said called device is performed in a communication channel that is different from the communication channel used for connecting said caller device with said called device.

14. The computer program product according to claim 8 wherein said communication between said calling party and said called party comprises a message.

15. A device for configuring a caller identification code, said device being part of a communication network; said device comprising:
   at least one of:
     a module for maintaining a plurality of caller identification codes for a calling party; and
     a first communication module for receiving from said calling party a selection of a caller identification code of said plurality of caller identification codes;
   a second communication module for forwarding to said called party, said selected caller identification code identifying said calling party, upon initiating a communication between said calling party and a called party, wherein said selected caller identification code is forwarded to at least one of another communication network, and said called device,
   wherein each of said caller identification codes identifies said calling party in at least one communication networks in an integrated communication network, wherein said integrated communication network includes a plurality of communication networks;
   wherein said caller identification code is selected according to a characteristics associated with content obtained from an external source associated with at least one of said calling party and said called party; and
   wherein said characteristics is associated with content obtained from an external source associated with at least one of said calling party and said called party, and wherein said external source is:
     external to a caller device used by said calling party,
     external to said called device,
     external to said communication network to which the caller device subscribes, and
     external to said another communication network to which said selected caller identification code is forwarded.

16. The device according to claim 15 wherein said content is derived from call history of at least one of said calling party and said called party, and
   wherein said call history content is external to said caller device, said called device, said communication network to which the caller device subscribes, and said another communication network.

17. The device according to claim 16 wherein at least one of said content and said call history is associated with a type of a previous communication between said calling party and said called party.

18. The device according to claim 15 wherein said caller identification code includes at least part of said content obtained from said external source.

19. The device according to claim 15, wherein said step of selecting a caller identification code from said plurality of caller identification codes according to content obtained from an external source is performed by a software program operating in said caller device; and additionally comprising a third module for communicating said selection from said caller device to a communication device connecting said caller device with said called device.

20. The device according to claim 19, wherein said step of communicating said selection from said caller device to said communication device connecting said caller device with said called device is performed in a communication channel that is different from the communication channel used for connecting said caller device with said called device.

21. The device according to claim 15, wherein said communication between said calling party and said called party comprises a message.

\* \* \* \* \*